United States Patent
Hosey et al.

(10) Patent No.: US 12,122,390 B2
(45) Date of Patent: Oct. 22, 2024

(54) DETERMINATION OF VEHICLE STATUS DATA VIA TRACKING OF CONNECTED DEVICES

(71) Applicant: GM GLOBAL TECHNOLOGY OPERATIONS LLC, Detroit, MI (US)

(72) Inventors: Eric T. Hosey, Royal Oak, MI (US); Matthew E. Gilbert-Eyres, Rochester, MI (US); Matthew Neely, Rochester, MI (US); Russell A. Patenaude, Macomb Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 240 days.

(21) Appl. No.: 17/873,461

(22) Filed: Jul. 26, 2022

(65) Prior Publication Data

US 2024/0034330 A1    Feb. 1, 2024

(51) Int. Cl.
*B60W 40/08* (2012.01)

(52) U.S. Cl.
CPC ..... *B60W 40/08* (2013.01); *B60W 2040/0881* (2013.01); *B60W 2540/049* (2020.02)

(58) Field of Classification Search
CPC ... B60W 2040/0881; B60W 2540/049; B60W 40/08
See application file for complete search history.

(56) References Cited

U.S. PATENT DOCUMENTS

| | | | | |
|---|---|---|---|---|
| 10,106,156 B1* | 10/2018 | Nave | ............... | B60W 50/0098 |
| 10,388,084 B1* | 8/2019 | Chan | ............... | H04W 4/44 |
| 10,863,020 B1* | 12/2020 | Russell | ............... | B60K 35/00 |
| 11,393,238 B1* | 7/2022 | Kentley-Klay | ..... | B60W 30/025 |
| 2008/0080741 A1* | 4/2008 | Yokoo | ............... | G08B 21/06 382/104 |
| 2012/0123633 A1* | 5/2012 | Uyeki | ............... | B60L 3/12 701/33.5 |
| 2014/0240089 A1* | 8/2014 | Chang | ............... | H04B 5/70 340/5.61 |
| 2016/0185358 A1* | 6/2016 | Todasco | ............... | A61B 5/6893 701/48 |
| 2017/0263120 A1* | 9/2017 | Durie, Jr. | ............... | G08G 1/205 |
| 2017/0353597 A1* | 12/2017 | Wolterman | ....... | H04M 1/72463 |
| 2019/0003877 A1* | 1/2019 | Aina | ............... | B60N 2/0026 |
| 2019/0225232 A1* | 7/2019 | Blau | ............... | G05D 1/0088 |
| 2020/0290626 A1* | 9/2020 | Chen | ............... | G01S 11/06 |
| 2021/0362726 A1* | 11/2021 | Dingli | ............... | G06V 20/64 |
| 2021/0403055 A1* | 12/2021 | Jeromin | ............... | H04W 4/024 |
| 2022/0379892 A1* | 12/2022 | Archer | ............... | B60W 30/188 |

(Continued)

Primary Examiner — Babar Sarwar
(74) *Attorney, Agent, or Firm* — Quinn IP Law

(57) ABSTRACT

A system for obtaining vehicle status data includes a location sensor configured to obtain location data for one or more connected devices in or around the vehicle. The vehicle has a plurality of seats, including at least one seat without an occupant sensor. The location data is obtained based at least partially on radiofrequency waves. A command unit is adapted to receive the location data. The command unit has a processor and tangible, non-transitory memory on which instructions are recorded. The command unit is adapted to obtain the vehicle status data in real time based in part on the location data of the one or more connected devices, the vehicle status data including a total number of occupants in the vehicle.

20 Claims, 3 Drawing Sheets

(56) References Cited

U.S. PATENT DOCUMENTS

| | | | |
|---|---|---|---|
| 2023/0036963 A1* | 2/2023 | Yamamoto | B60R 16/037 |
| 2023/0111748 A1* | 4/2023 | Park | B60R 16/037 |
| | | | 340/573.1 |
| 2023/0205205 A1* | 6/2023 | Potnis | B60W 30/182 |
| | | | 701/23 |
| 2023/0294705 A1* | 9/2023 | Ali | G01S 13/753 |
| | | | 701/1 |
| 2023/0382394 A1* | 11/2023 | Roberts | H04M 1/72454 |

* cited by examiner

DETERMINATION OF VEHICLE STATUS DATA VIA TRACKING OF CONNECTED DEVICES

INTRODUCTION

The present disclosure relates generally to determination of vehicle status data via tracking of one or more connected devices. More specifically, the disclosure pertains to a system and method for obtaining vehicle status data via tracking of one or more connected devices that are in or around the vehicle. It is an undeniable facet of modern life that many people spend a considerable amount of time in their vehicles while being transported from one place to another. Vehicle status data may be useful in different scenarios. For example, obtaining the total number of occupants and their location may be helpful in the assessment of a concerning situation. However, many vehicles may not have occupancy sensors in each of their seats. For example, many seats in the back row of a vehicle or extended seats may not be equipped with occupancy sensors.

SUMMARY

Disclosed herein is a system for obtaining vehicle status data. The system includes a location sensor configured to obtain location data for one or more connected devices in or around the vehicle. The vehicle has a plurality of seats, including at least one seat without an occupant sensor. The location data is obtained based at least partially on radiofrequency waves. A command unit is adapted to receive the location data. The command unit has a processor and tangible, non-transitory memory on which instructions are recorded. The command unit is adapted to obtain the vehicle status data in real time based in part on the location data of the one or more connected devices. The vehicle status data includes a total number of occupants in the vehicle.

The connected devices may include at least one of a mobile device, a smartwatch and a laptop. In one embodiment, the location sensor employs ultra-wideband technology to obtain the location data. The location sensor may employ Bluetooth technology to obtain the location data. The vehicle status data may be transmitted to a remote assistance unit. The vehicle status data may include at least one of a projectile data, seat ejection data and vehicle orientation data.

The command unit may be adapted to calculate a respective movement rate of the one or more connected devices based in part on the location data and report a projectile detection when the respective movement rate is above a predetermined threshold. The command unit may be adapted to calculate a respective movement rate and a respective movement pattern of the one or more connected devices based in part on the location data and report a seat ejection when the respective movement rate and/or the respective movement pattern fits a predefined pattern.

In one embodiment, the command unit is adapted to determine a respective reference axis location of the one or more connected devices and report an inverted vehicle status when the respective reference axis location indicates that the one or more connected devices is resting on an inner roof of the vehicle. The command unit may be adapted to determine the total number of occupants in the vehicle as a sum of a number of confirmed occupants and the number of suspected occupants. The number of confirmed occupants is determined by the plurality of seats having an occupied status indicated by the occupant sensor. The number of suspected occupants is determined by the plurality of seats without the occupant sensor but indicating presence of the one or more connected devices, based on the location data.

The system may include one or more seatbelt sensors adapted to respectively determine a buckled state or an unbuckled state for the plurality of seats in the vehicle. The command unit is adapted to send an alert when the plurality of seats without occupant sensors indicates the unbuckled state but show presence of the one or more connected devices, based on the location data.

Disclosed herein is a method for obtaining vehicle status data in a vehicle having a command unit with a processor and tangible, non-transitory memory on which instructions are recorded. The method includes obtaining location data for one or more connected devices in or around the vehicle, via a location sensor in the vehicle, based at least partially on radiofrequency waves. The location data is transmitted to the command unit, the vehicle having a plurality of seats, including at least one seat without an occupant sensor. The method includes obtaining the vehicle status data in real time based in part on the location data of the one or more connected devices, the vehicle status data including a total number of occupants in the vehicle.

The above features and advantages and other features and advantages of the present disclosure are readily apparent from the following detailed description of the best modes for carrying out the disclosure when taken in connection with the accompanying drawings.

Figure 1:
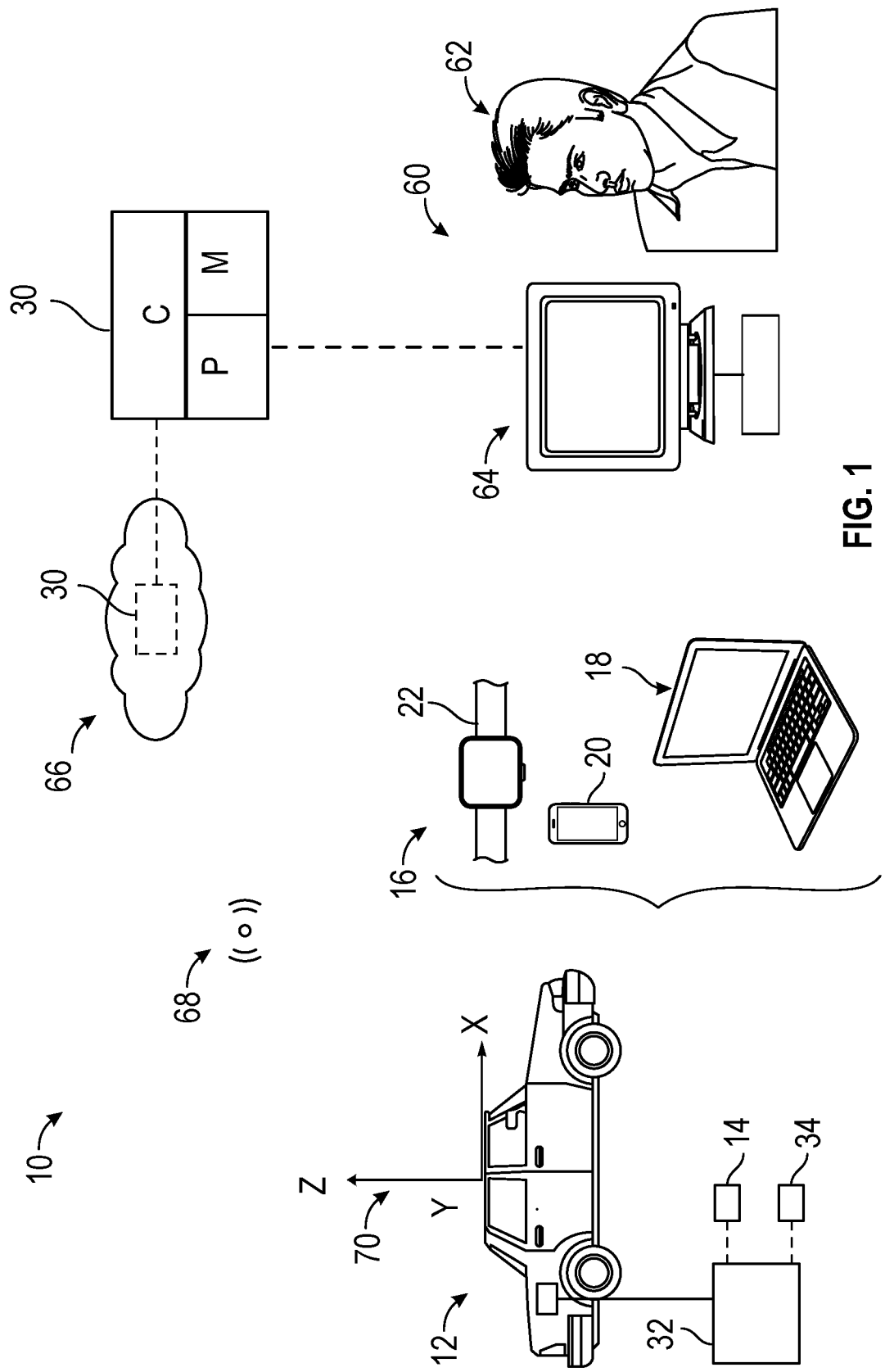
FIG. 1 is a schematic fragmentary diagram of a system for obtaining vehicle status data in a vehicle.

Representative embodiments of this disclosure are shown by way of non-limiting example in the drawings and are described in additional detail below. It should be understood, however, that the novel aspects of this disclosure are not limited to the particular forms illustrated in the above-enumerated drawings. Rather, the disclosure is to cover modifications, equivalents, combinations, sub-combinations, permutations, groupings, and alternatives falling within the scope of this disclosure as encompassed, for instance, by the appended claims.

DETAILED DESCRIPTION

Figure 2:
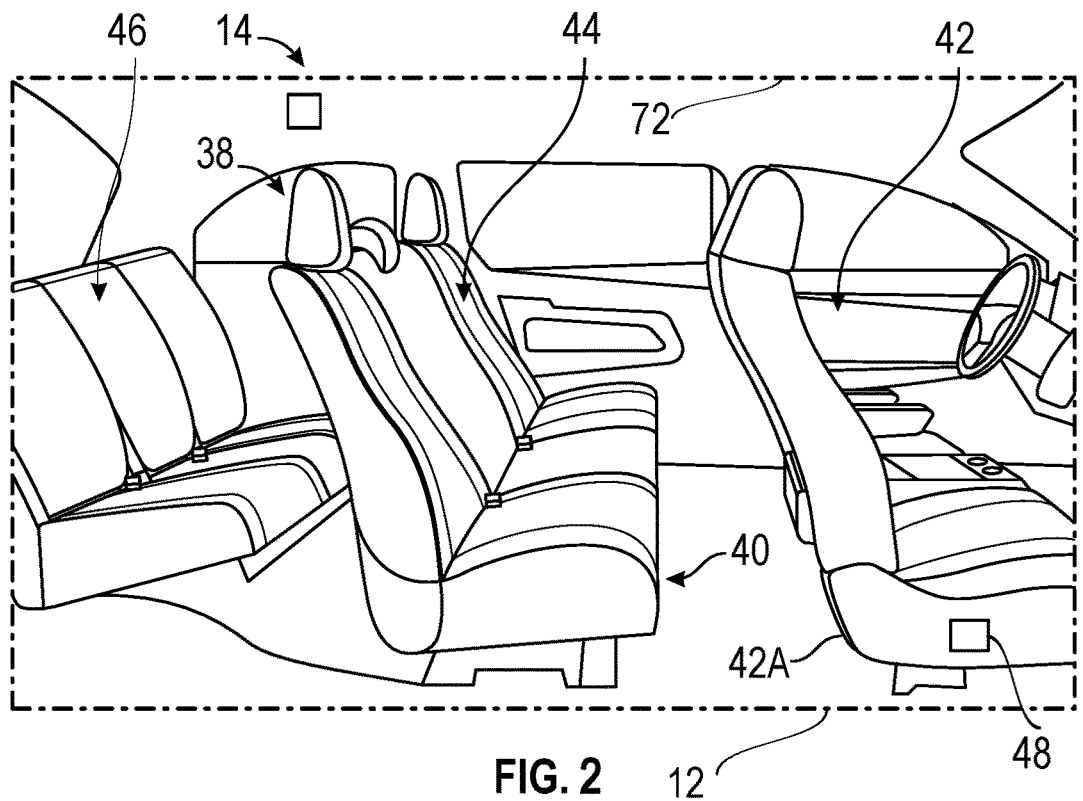
FIG. 2 is a schematic fragmentary perspective view of an interior of the vehicle of FIG. 1.
Figure 3:
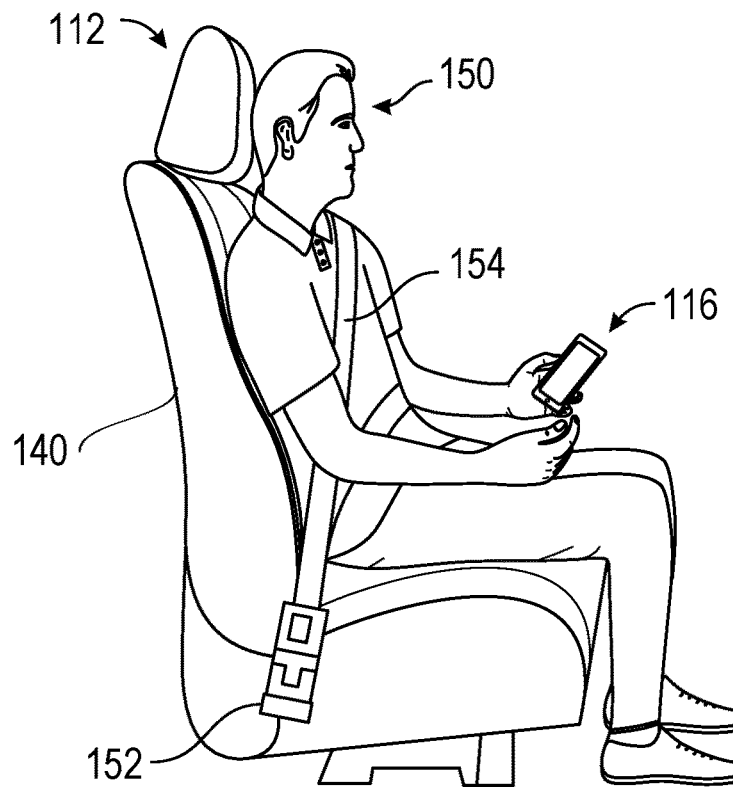
FIG. 3 is a schematic fragmentary perspective view of an example vehicle seat with an occupant.

Referring to the drawings, wherein like reference numbers refer to like components, FIG. 1 schematically illustrates a system 10 for obtaining vehicle status data for a vehicle 12 (shown in FIGS. 1-3). The vehicle 12 may include, but is not limited to, a passenger vehicle, sport utility vehicle, light truck, heavy duty vehicle, minivan, bus, transit vehicle, bicycle, moving robot, farm implement (e.g., tractor), sports-related equipment (e.g., golf cart), boat, plane, train or another moving platform. The vehicle 12 may be an electric vehicle, which may be purely electric or hybrid/partially electric. It is to be understood that the vehicle 12 may take many different forms and have additional components.

Referring to FIGS. 1-2, the vehicle 12 includes a location sensor 14 that is configured to obtain location data based at least partially on radiofrequency waves. Radio waves are electromagnetic waves of frequency between 30 Hertz (Hz) and 300 Gigahertz (GHz). Referring to FIG. 1, the location data is obtained for one or more connected devices 16 ("one or more" omitted henceforth) in or around the vehicle 12. In other words, the connected devices 16 are discoverable through the use of radiofrequency waves. Referring to FIG. 1, the connected devices 16 may include but are not limited to, a laptop 18, a mobile device 20, a smart device such as a smartwatch 22 and a tablet (not shown).

Referring to FIG. 1, the system 10 includes a command unit 30 having an integrated controller C with at least one processor P and at least one memory M (or non-transitory, tangible computer readable storage medium) on which instructions are recorded for a method 200 (described below with respect to FIG. 4). The memory M can store command unit-executable instruction sets, and the processor P can execute the command unit-executable instruction sets stored in the memory M.

Referring to FIG. 1, the vehicle 12 includes a vehicle controller 32 collecting information from the location sensor 14. The vehicle 12 may include a telematics control unit 34 for establishing two-way communications with the command unit 30, including recording and transmitting the location data obtained by the location sensor 14. The telematics control unit 34 may further collect telemetry data, such as location, speed, engine data, maintenance requirements and servicing, by interfacing with various internal subsystems. The telematics control unit 34 may enable vehicle-to-vehicle (V2V) communication and/or a vehicle-to-everything (V2X) communication.

The system 10 is adapted to determine vehicle status data for the vehicle 12 in real time based in part on the location data for the connected devices 16. The vehicle status data includes an estimate of the number of occupants in the vehicle 12 in the absence of occupant sensors. Additionally, the vehicle status data may include determination of seat location and seatbelt usage (as described below, with seatbelt sensors 152 in FIG. 3). The vehicle status data may include projectile data pertaining to projectile movement (e.g., movements of the connected devices 16) during a concerning event as well as seat ejection data within the vehicle 12. The vehicle status data may further include vehicle orientation data (relative to an XYZ axis in FIG. 1), which may be beneficial in an event where the vehicle 12 has rotated or is in an inverted position.

FIG. 2 is a schematic fragmentary perspective view of an interior of the vehicle 12. Referring to FIG. 2, the vehicle 12 has a plurality of seats 38, with at least one vehicle seat 40 not having an occupant sensor. The location data is used to obtain vehicle status data in the absence of occupancy sensors. The example vehicle 12 shown in FIG. 2 has a first row of seats 42, a second row of seats 44 and a third row of seats 46. Referring to FIG. 2, the vehicle 12 may include other seats (e.g., seat 42A) having an occupant sensor 48 which detects its occupancy status, generally by using a weight estimate.

Another example vehicle 112 is shown in FIG. 3. Referring FIG. 3, an occupant 150 is sitting on a vehicle seat 140 which does not have an occupant sensor. The occupant 150 is holding an example connected device 116. The vehicle seat 140 is equipped with a seatbelt sensor 152 for detecting usage of the seatbelt 154, in other words, detecting unbuckled occupants on the vehicle seat 140. Seatbelt sensors may exist in the absence of seat occupancy sensors. As described below, the system 10 may obtain seatbelt usage data and selectively send out seatbelt alerts (per block 206 of FIG. 4).

The vehicle status data is beneficial in the assessment of several situations. For example, during certain events, the connected devices 16 and/or human occupants may be thrown around within or even ejected from the vehicle 12. The information obtained by the vehicle controller 32 and/or the command unit 30 may be sent to a remote assistance unit 60, as shown in FIG. 1. The remote assistance unit 60 may be manned electronically and/or by a remote advisor 62 having access to an electronic device 64 such as a desktop computer, laptop, tablet, cell phone or wearable device. The precise location of the connected devices 16 and the rate of location change (e.g., in coordination with seatbelt sensors 152) may be used to alert the remote advisor 62 of potential ejections and other issues. This beneficial information may be shared with first responders arriving at a scene.

Referring to FIG. 1, the command unit 30 may be hosted or based out of a remotely located cloud computing service 66. The cloud computing service 66 may include one or more remote servers hosted on the Internet to store, manage and process data. The cloud computing service 66 may be at least partially managed by personnel at various locations. The cloud computing service 66 may be a private or public source of information maintained by an organization, such as for example, a research institute, a company, a university and/or a hospital.

The system 10 may employ a wireless network 68 for communications between the vehicle 12 and the command unit 30, shown in FIG. 1. The wireless network 68 may be a short-range network or a long-range network. The wireless network 68 may be a communication BUS, which may be in the form of a serial Command unit Area Network (CAN-BUS). The wireless network 68 may be a serial communication bus in the form of a local area network. The local area network may include, but is not limited to, a Command unit Area Network (CAN), a Command unit Area Network with Flexible Data Rate (CAN-FD), Ethernet, Bluetooth, WIFI and other forms of data. The wireless network 68 may be a Wireless Local Area Network (LAN) which links multiple devices using a wireless distribution method, a Wireless Metropolitan Area Network (MAN) which connects several wireless LANs or a Wireless Wide Area Network (WAN) which covers large areas such as neighboring towns and cities. Other types of network technologies or communication protocols available to those skilled in the art may be employed.

Figure 4:
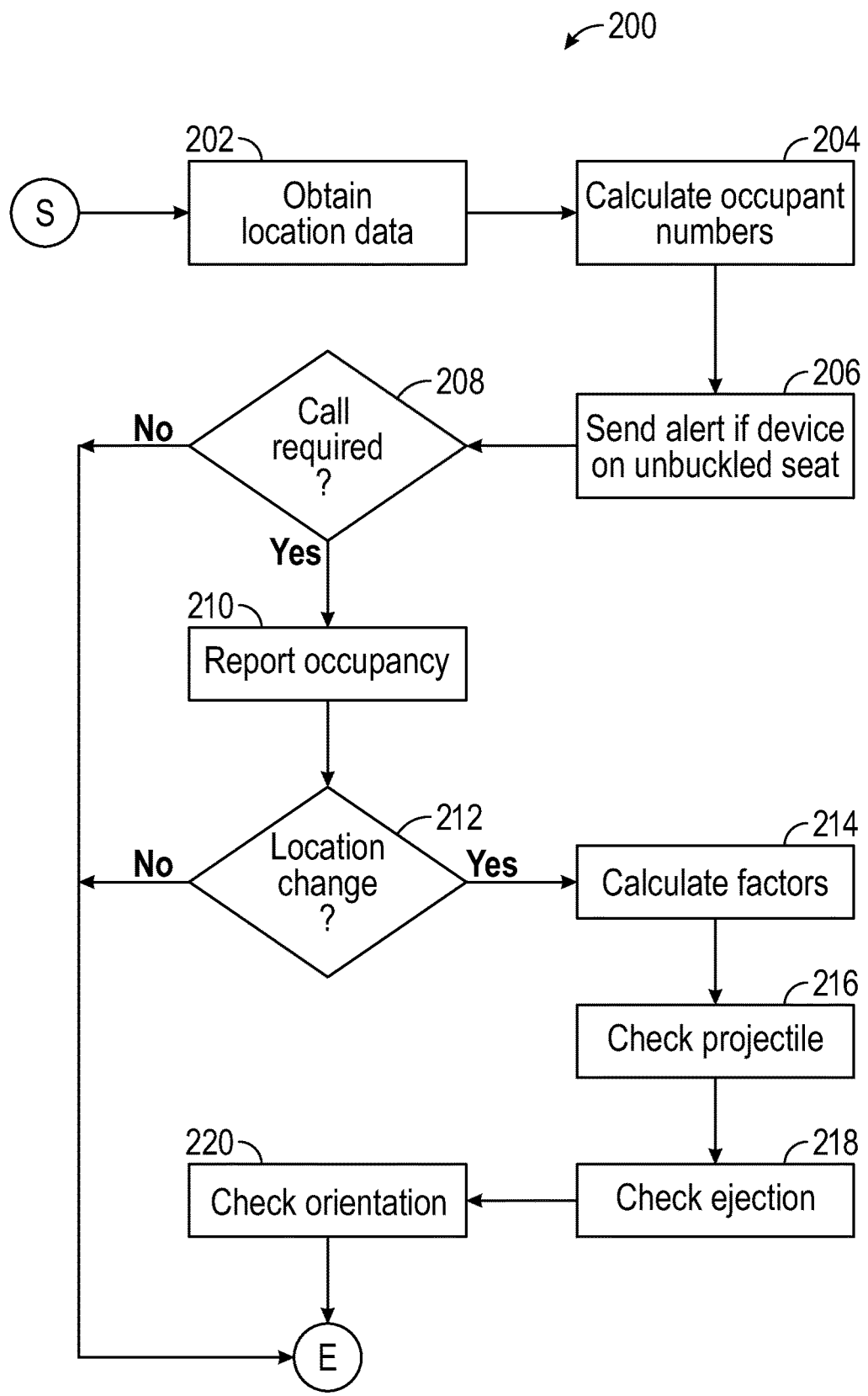
FIG. 4 is a flowchart for a method of operating the system of FIG. 1.

Referring now to FIG. 4, a flowchart of a method 200 for operating the system 10 is shown. Method 200 need not be applied in the specific order recited herein. Furthermore, it is to be understood that some blocks may be eliminated. In some embodiments, method 200 may be embodied as computer-readable code or stored instructions and may be at least partially executable by the command unit and/or the vehicle controller. The start and end of the method 200 are indicated by the letters "S" and "E."

Beginning at block 202 of FIG. 4, the method 200 includes obtaining location data of the connected devices 16 detected within the vehicle 12. The system 10 employs radiofrequency technologies capable of precision location to assist with determining the vehicle status data. The location sensor 14 of FIGS. 1-2 may employ ultra-wideband technology to obtain the precise location of the connected devices 16. Ultra-wideband technology employs a relatively low energy level for short-range, high-bandwidth communications over a large portion of the radio spectrum, such as for example at or above 500 Mega Hertz. This allows the transmission of a relatively large amount of energy which does not interfere with traditional narrowband and carrier wave transmission in the same frequency band.

In another embodiment, the location sensor 14 may employ Bluetooth technology using ultra-high frequency radio waves. The location sensor 14 may include one or more detectors positioned at various points in or around the vehicle 12, the various points being selected based on the application at hand. In one example, the location sensor 14 operates on a 2.4 Giga Hertz radio frequency. In another example, the location sensor operates on a 5 Giga Hertz radio frequency.

Advancing to block 204 of FIG. 4, the method 200 includes determining a total number of occupants in the vehicle 12 as a sum of the number of confirmed occupants and the number of additional suspected occupants. The number of confirmed occupants may be obtained or defined as the plurality of seats 38 equipped with a respective occupant sensor (such as occupant sensor 48) indicating occupied status. The number of additional suspected occupants may be obtained as the plurality of seats 38 that are not equipped with occupant sensors, but which indicate the presence of the connected devices 16 based on the location data.

Proceeding to block 206 of FIG. 4, the method 200 may include determining if at least one of the connected devices 16 is located in an unbuckled seat without an occupant sensor. As shown in FIG. 3, the vehicle 112 may include a seatbelt sensor 152 adapted to determine a buckled state or an unbuckled state for the vehicle seat 140. Per block 206, the command unit 30 may be adapted to send an alert to the occupants of the vehicle 12 to buckle their seatbelt when at least one of the connected devices 16 is detected (based on the location data) in proximity to a vehicle seat in an unbuckled state.

Advancing to block 208, the method 200 may include determining if a call to the vehicle 12 from the remote assistance unit 60 is required. This determination may be made based on predefined protocols. The call may be made, for example, through the telematics control unit 34 or OnStar. If a call is required (Block 208=YES), the method 200 proceeds to block 210, where the remote assistance unit 60 is prompted to contact the vehicle 12 and the number and location of the occupants is reported. If a call is not required (Block 208=NO), the method 200 is ended. As noted above, it is understood that some blocks may be eliminated.

From block 210, the method 200 proceeds to block 212, where the command unit 30 is adapted to determine if the respective location of the connected devices 16 has changed. If the location has not changed (Block 212=NO), the method 200 is ended. If the location has changed (Block 212=YES), the method 200 proceeds to block 214, where the command unit 30 is adapted to calculate various parameters pertaining to the movement of the connected devices 16. The parameters may include a movement rate and a movement pattern of each of the connected devices 16. The parameters may include a reference axis location 70 (e.g., z-axis location) of the connected devices 16. The reference axis location 70 is a vector centered at a specific point on the vehicle 12. For example, the origin of the reference axis location 70 may be selected to be the highest and central point on the vehicle 12.

Proceeding from block 214 to block 216, the method 200 may include flagging or reporting a projectile detection when the respective movement rate of one of the connected devices 16 is above a predetermined threshold. For example, the command unit 30 may be configured to analyze the rate of change of the location of the connected devices 16 via one or more pattern recognition software programs.

Advancing to block 218 of FIG. 4, the method 200 may include flagging or reporting a seat ejection when the respective movement rate and/or the respective movement pattern of one of the connected devices 16 indicates potential human movement from the vehicle seat. The command unit 30 may employ digital filters and/or finite impulse events for pattern matching to determine if the ejection was merely the ejection of the connected devices 16 (which would result in a higher trajectory speed) or if the ejection involved an actual human with the connected devices 16 on their body (which would result in a lower trajectory speed).

Proceeding to block 220 of FIG. 4, the method 200 may include determining a vehicle orientation status based on the location data. Per block 220, the command unit 30 may be adapted to report an inverted vehicle status when the respective reference axis location 70 (see FIG. 1) indicates that at least one of the connected devices 16 is resting on an inner roof 72 (see FIG. 2) of the vehicle 12.

In summary, an effective way of obtaining vehicle status data is disclosed for a vehicle 12 with at least one seat (e.g., vehicle seat 40, 140 in FIGS. 2-3 respectively) not having an occupant sensor. The system 10 provides beneficial information in the event of a concerning situation. The system 10 provides cost savings by not requiring occupant sensors.

The command unit 30 of FIG. 1 includes a computer-readable medium (also referred to as a processor-readable medium), including a non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, other magnetic medium, a CD-ROM, DVD, other optical medium, a physical medium with patterns of holes, a RAM, a PROM, an EPROM, a FLASH-EEPROM, other memory chip or cartridge, or other medium from which a computer can read.

Look-up tables, databases, data repositories or other data stores described herein may include various kinds of mechanisms for storing, accessing, and retrieving various kinds of data, including a hierarchical database, a group of files in a file rechargeable energy storage system, an application database in a proprietary format, a relational database energy management system (RDBMS), etc. Each such data store may be included within a computing device employing a computer operating system such as one of those mentioned above and may be accessed via a network in one or more of a variety of manners. A file system may be accessible from a computer operating system and may include files stored in various formats. An RDBMS may employ the Structured Query Language (SQL) in addition to a language for creating, storing, editing, and executing stored procedures, such as the PL/SQL language mentioned above.

The flowcharts illustrate an architecture, functionality, and operation of possible implementations of systems, methods, and computer program products of various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by specific purpose hardware-based storage systems that perform the specified functions or acts, or combinations of specific purpose hardware and computer instructions. These computer program instructions may also be stored in a computer-readable medium that can direct a command unit or other programmable data processing apparatus to function in a particular manner, such that the instructions stored in the computer-readable medium produce an article of manufacture including instructions to implement the function/act specified in the flowchart and/or block diagram blocks.

The numerical values of parameters (e.g., of quantities or conditions) in this specification, including the appended claims, are to be understood as being modified in each respective instance by the term "about" whether or not "about" actually appears before the numerical value. "About" indicates that the stated numerical value allows some slight imprecision (with some approach to exactness in the value; about or reasonably close to the value; nearly). If the imprecision provided by "about" is not otherwise understood in the art with this ordinary meaning, then "about" as used here indicates at least variations that may arise from ordinary methods of measuring and using such parameters. In addition, disclosure of ranges includes disclosure of each value and further divided ranges within the entire range. Each value within a range and the endpoints of a range are hereby disclosed as separate embodiments.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings, or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A system for obtaining vehicle status data for a vehicle, the system comprising:
    a location sensor configured to obtain location data for one or more connected devices in or around the vehicle based at least partially on radiofrequency waves;
    a command unit configured to receive the location data, the command unit having a processor and tangible, non-transitory memory on which instructions are recorded;
    a remote assistance unit in communication with the command unit, the remote assistance unit being manned by a remote advisor;
    wherein the vehicle has a plurality of seats, including at least one seat without an occupant sensor;
    one or more seatbelt sensors in the vehicle, the one or more seatbelt sensors being configured to determine a respective buckled state or a respective unbuckled state for the plurality of seats in the vehicle;
    wherein the command unit is configured to generate the vehicle status data in real time based in part on the location data of the one or more connected devices and transmit the vehicle status data to the remote assistance unit, the vehicle status data including a total number of occupants in the vehicle; and
    wherein operation of the vehicle is controlled based in part on the vehicle status data, the remote assistance unit being prompted by the command unit to contact one or more occupants in the vehicle when the one or more connected devices is detected in proximity to the at least one seat without the occupant sensor, and the at least one seat without the occupant sensor indicates the respective unbuckled state.

2. The system of claim 1, wherein the one or more connected devices includes at least one of a mobile device, a smartwatch and a laptop.

3. The system of claim 1, wherein the location sensor employs ultra-wideband technology to obtain the location data.

4. The system of claim 1, wherein the location sensor employs Bluetooth technology to obtain the location data.

5. The system of claim 1, wherein the vehicle status data includes at least one of a projectile data, a seat ejection data, and a vehicle orientation data.

6. The system of claim 1, wherein the command unit is configured to:
    calculate a respective movement rate of the one or more connected devices based in part on the location data; and
    report a projectile detection to the remote assistance unit when the respective movement rate is above a predetermined threshold.

7. The system of claim 1, wherein the command unit is configured to:
    calculate a respective movement rate and a respective movement pattern of the one or more connected devices based in part on the location data; and
    report a seat ejection to the remote assistance unit when the respective movement rate and/or the respective movement pattern fits a predefined pattern.

8. The system of claim 1, wherein the command unit is configured to:
    determine a respective reference axis location of the one or more connected devices; and
    report an inverted vehicle status to the remote assistance unit when the respective reference axis location indicates that the one or more connected devices is resting on an inner roof of the vehicle.

9. The system of claim 1, wherein:
    the command unit is adapted to determine the total number of occupants in the vehicle as a sum of a number of confirmed occupants and the number of suspected occupants;
    the number of confirmed occupants is determined by the plurality of seats having an occupied status indicated by the occupant sensor; and
    the number of suspected occupants is determined by the plurality of seats without the occupant sensor but indicating presence of the one or more connected devices, based on the location data.

10. A method for obtaining vehicle status data in a vehicle having a command unit with a processor and tangible, non-transitory memory on which instructions are recorded, the method comprising:
- obtaining location data for one or more connected devices in or around the vehicle, via a location sensor in the vehicle, based at least partially on radiofrequency waves;
- transmitting the location data from the location sensor to the command unit, the vehicle having a plurality of seats, including at least one seat without an occupant sensor;
- generating the vehicle status data in real time based in part on the location data of the one or more connected devices, via the command unit, and transmitting the vehicle status data from the command unit to a remote assistance unit manned by a remote advisor, the vehicle status data including a total number of occupants in the vehicle;
- determining a respective buckled state or a respective unbuckled state for the plurality of seats in the vehicle, via one or more seatbelt sensors in the vehicle; and
- controlling operation of the vehicle based in part on the vehicle status data, including prompting the remote assistance unit, via the command unit, to contact one or more occupants in the vehicle when the one or more connected devices is detected in proximity to the at least one seat without the occupant sensor, and the at least one seat without the occupant sensor indicates the respective unbuckled state.

11. The method of claim 10, wherein the one or more connected devices includes at least one of a mobile device, a smartwatch, a tablet and a laptop.

12. The method of claim 10, further comprising:
- employing ultra-wideband technology to obtain the location data, via the location sensor.

13. The method of claim 10, further comprising:
- employing Bluetooth technology to obtain the location data, via the location sensor.

14. The method of claim 10, further comprising:
- calculating a respective movement rate of the one or more connected devices based in part on the location data, via the command unit; and
- reporting a projectile detection to the remote assistance unit when the respective movement rate is above a predetermined threshold, via the command unit.

15. The method of claim 10, further comprising:
- calculating a respective movement rate and a respective movement pattern of the one or more connected devices based in part on the location data, via the command unit; and
- reporting a seat ejection to the remote assistance unit when the respective movement rate and/or the respective movement pattern fits a predefined pattern, via the command unit.

16. The method of claim 10, further comprising:
- determining a respective reference axis location of the one or more connected devices based in part on the location data, via the command unit; and
- reporting an inverted vehicle status to the remote assistance unit when the respective reference axis location indicates that the one or more connected devices is resting on an inner roof of the vehicle, via the command unit.

17. The method of claim 10, further comprising:
- determining a total number of occupants in the vehicle as a sum of a number of confirmed occupants and the number of suspected occupants, via the command unit;
- determining the confirmed occupants by the plurality of seats having an occupied status indicated by the occupant sensor; and
- determining the suspected occupants by the plurality of seats not having the occupant sensor but indicating presence of the one or more connected devices, based on the location data.

18. A vehicle in communication with a command unit and a remote assistance unit, the vehicle comprising:
- a plurality of seats, including at least one seat without an occupant sensor;
- one or more seatbelt sensors configured to determine a respective buckled state or a respective unbuckled state for the plurality of seats in the vehicle;
- a location sensor configured to obtain location data for one or more connected devices in or around the vehicle based at least partially on radiofrequency waves, the location data being transmitted to the command unit;
- wherein the command unit has a processor and tangible, non-transitory memory on which instructions are recorded and the remote assistance unit is manned by a remote advisor;
- wherein the command unit is configured to generate the vehicle status data in real time based in part on the location data and transmit the vehicle status data to the remote advisor in the remote assistance unit;
- wherein the vehicle status data includes a total number of occupants in the vehicle and at least one of a projectile data, a seat ejection data, and a vehicle orientation data; and
- wherein operation of the vehicle is controlled based in part on the vehicle status data, the remote assistance unit being prompted by the command unit to contact one or more occupants in the vehicle when the one or more connected devices is detected in proximity to the at least one seat without the occupant sensor, and the at least one seat without the occupant sensor indicates the respective unbuckled state.

19. The vehicle of claim 18, wherein the command unit is configured to:
- calculate a respective movement rate and a respective movement pattern of the one or more connected devices based in part on the location data; and
- report a seat ejection to the remote assistance unit when the respective movement rate and/or the respective movement pattern fits a predefined pattern.

20. The vehicle of claim 18, wherein the command unit is configured to:
- determine a respective reference axis location of the one or more connected devices; and
- report an inverted vehicle status to the remote assistance unit when the respective reference axis location indicates that the one or more connected devices is resting on an inner roof of the vehicle.

* * * * *